Patented May 29, 1945

2,377,095

UNITED STATES PATENT OFFICE 2,377,095

POLYMERIZATION OF PHTHALATE DERIVATIVES

Irving E. Muskat, Akron, Ohio, assignor to Pittsburgh Plate Glass Company, Allegheny County, Pa., a corporation of Pennsylvania No Drawing. Application February 18, 1939, Serial No. 257,134

6 Claims. (Cl. 260—78)

This invention relates to unsaturated esters of phthalic acid and to the polymers which may be secured therefrom. In accordance with my invention, I have been able to produce unsaturated esters of phthalic acid by esterification of this acid with mono-hydric unsaturated alcohols and to polymerize these esters whereby novel products of high transparency and hardness, which may be made either fusible or substantially infusible, may be secured. I have found that these unsaturated polyesters of phthalic acid, particularly diallyl or dimethallyl phthalate, may be polymerized to form solid resinous products which are very clear and transparent. The products when completely polymerized are found to be substantially infusible and insoluble. On the other hand, polymerization may be interrupted before the insoluble polymer is formed and in this case the polymer is found to be thermoplastic and is soluble in the usual solvents in which vinylic resins may be dissolved. These fusible materials may be molded or shaped and subsequently cured to the infusible state in their shaped form.

Particularly desirable products may be secured from the diallyl or dimethallyl phthalates. However, other unsaturated phthalates, such as the divinyl, diethylallyl, dipropargyl, dicrotyl, di-2 chloroallyl, dioleyl, divinyl esters, or other unsaturated esters wherein both acid groups of the phthalate have been esterified with an unsaturated alcohol, may be prepared and polymerized to produce desirable materials. Similarly, mixed esters, such as allyl crotyl phthalate, allyl methallyl phthalate, etc., may be prepared and treated in a similar manner.

The esters may be prepared by esterification of phthalic anhydride in convenient manner with the desired unsaturated alcohol. In general, the esterification may be accomplished by heating a mixture of the anhydride and an excess of the desired alcohol to a suitable temperature, generally 100° C. in the presence of a suitable esterification catalyst, such as p-toluene-sulfonic acid.

In order to prevent polymerization of the material as it is prepared it may be desirable to add an inhibitor such as hydroquinone. After heating the mixture for a suitable time, for example 12–20 hours, it may be washed with water and/or weak alkali solution and the diester may be distilled and recovered.

As previously noted, upon polymerization of the phthalate polyesters herein described, which contains two or more polymerizable groups, a fusible polymer is preliminarily formed. As polymerization proceeds, however, the polymer is converted into an infusible gel which may be further polymerized to a hard, infusible, insoluble form. In many cases, it is found desirable to conduct the polymerization of these materials in two stages whereby the intermediate fusible polymer may be recovered. This may be done by interrupting polymerization before the material has been converted to the gel state and, in general, polymerization is interrupted while the monomer-polymer mixture is a viscous liquid. Polymerization may be interrupted by cooling, addition of inhibitors or other methods as hereinafter more fully described. In accordance with one suitable polymerization method, the phthalate esters may be polymerized in a solvent which is capable of dissolving the fusible polymer. In general, it has been found that the solvents, in which polymers of the saturated esters of the acrylates or alpha-substituted acrylates, or other thermoplastic vinylic polymers, such as methyl methacrylate, methyl chloracrylate, vinyl acetate polymers, etc., are soluble may be used for this purpose. Thus, such solvents as acetone, dioxane, chloroform, toluene, benzene, carbon tetrachloride, methyl cellosolve acetate, phenyl cellosolve, dichloroethyl ether, xylene, tetralin, dibutyl phthalate, etc., are found to be suitable. In addition, the saturated acrylic or alpha-substituted acrylic esters such as monomeric methyl, ethyl, propyl, etc., methacrylate or chloracrylate, or other polymerizable materials, for example "vinylic" compounds, such as styrene, vinyl chloride, vinyl acetate, etc., may be added to the above solution before polymerization in order to form copolymers. Since such materials particularly vinyl acetate, vinyl chloride, styrene, etc., dissolve substantial amounts of the fusible polymers, they may be used themselves as solvents. For most purposes, however, sufficient unsaturated phthalate should be present to permit the formation of the infusible polymer if it is desired. In general, in excess of 25 percent of the phthalate ester is found preferable. In order to secure the fusible polymer, the polymerization may be interrupted before gelation occurs and, in general, the polymerization is permitted to proceed until the solution becomes viscous after which polymerization is stopped. In accordance with one illustrative method of interrupting polymerization, the polymer may be separated from the solvent by convenient methods, for example, by the addition of a compound in which phthalate polymers are normally insoluble, such as methyl or ethyl alcohol, petroleum ether, water, ethylene glycol, etc. This process permits the isolation of the fusible polymer of unsaturated di-esters of phthalic acid in a substantially pure state.

Polymerization may also be halted by lowering the temperature of the reaction mixture to a suitable degree, for example, to room temperature or below. It has been found that although polymerization proceeds fairly rapidly at temperatures of 110-120° C. or above, the reaction rate increasing with increase of temperature, it proceeds at such a slow rate that it may be practically discontinued at room temperature. This is especially true when polymerization is carried out in solution.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before polymerization has been initiated. In this manner, a solution of the fusible polymer may be secured. These solutions may be treated to remove the solvent by slow evaporation, treatment with a nonsolvent, or other suitable method and fusible cast thermoplastic polymers which may be machined, cut, bent or otherwise worked into desirable forms thereby obtained. After final shaping, the products may be completely hardened and rendered infusible by suitable methods hereinafter more fully set forth.

It is also possible to produce the fusible polymer in accordance with my invention without resorting to the use of solutions of the monomer. Thus, the monomer may be polymerized directly by use of heat and/or light preferably in the presence of catalysts, such as air, ozone, oxygen, peroxides, and the like and interrupting polymerization at the proper time. Since the polymerization proceeds without undue rapidity, the reaction may be stopped before the gel state is reached without difficulty either by use of inhibitors or by cooling as hereinbefore mentioned.

The fusible polymer is purified by treatment to remove all or substantially all of the residual monomer and is thus obtained for use in a substantially pure state. Residual monomer may be removed by distillation under subatmospheric pressure or by extraction with a solvent for the monomer which is a nonsolvent for the polymer, such as ethyl or methyl alcohol. In addition, a substantially pure product may be obtained by dissolving the mixture in a solvent for the fusible polymer such as acetone, phenyl cellosolve acetate, etc., and treating the solution with water or other nonsolvent to precipitate the polymer.

The following examples illustrate the preparation of these fusible polymers:

*Example I*

One part by weight of diallyl phthalate was heated with 0.1 part by weight of benzoyl peroxide and one part by weight of xylene under reflux for 8 hours. The resulting solution was carefully poured, with stirring, into methanol until precipitation was complete. A white precipitate which was fusible and soluble in acetone was formed. This material began to soften when heated to 110° C., and was a soft plastic mass at 130-140° C. However, prolonged heating caused loss of this plasticity, with the formation, first of an elastic, and then a hard, brittle product.

*Example II*

A quantity of diallyl phthalate was prepared by heating a mixture of allyl alcohol and phthalic anhydride, which contained allyl alcohol in amount slightly in excess of the theoretical amount required for diallyl phthalate, to a temperature of 90-95° C. in the presence of 2 percent by weight of paratoluenesulphonic acid for 15 hours. The mixture was washed with 0.1 N sodium hydroxide solution to remove acid and unreacted material and the diallyl phthalate was recovered as a colorless liquid by distillation at a pressure of 6 millimeters of mercury and a temperature of 170° C.

One part by weight of diallyl phthalate was heated at 150° C. for two and one-half hours and was then dissolved in two parts by weight of acetone. Methyl alcohol was added to the solution in an amount required to completely precipitate the polymer as a white powder. This powder fused at a temperature of 140° C.

*Example III*

A quantity of dimethallyl phthalate was prepared by heating a mixture of 200 parts by weight of methallyl alcohol, 150 parts by weight of phthalic anhydride and 7 parts by weight of p-toluenesulfonic acid to a temperature of 100-110° C. for 15 hours. The mixture was washed first with water and then with 0.1 N sodium hydroxide solution to remove excess acid and the dimethallyl phthalate was recovered as a liquid by distillation at an absolute pressure of 6 mm. of mercury.

A quantity of the dimethallyl ester was heated with one percent benzoyl peroxide for three hours at a temperature of 175° C. and the fusible polymer was recovered by dissolving the mixture in acetone and precipitating with methyl alcohol. The polymer was a white powder which fused at 160° C.

*Example IV*

A quantity of dioleyl phthalate was prepared by heating a mixture of 800 parts by weight of oleyl alcohol, 150 parts by weight of phthalic anhydride and 15 parts by weight of p-toluenesulfonic acid to a temperature of 100-110° C. for 15 hours. The mixture was washed first with water and then with 0.1 N sodium hydroxide solution to remove excess acid and the dioleyl phthalate was recovered by distillation at a pressure of 6 mm. of mercury.

A quantity of the dioleyl ester was heated with one percent benzoyl peroxide for three hours at a temperature of 175° C. and the fusible polymer was recovered by dissolving the mixture in acetone and precipitating with methyl alcohol. The polymer was a white powder which fused at 135° C.

The fusible polymers so produced have many characteristics which are similar to those of the thermoplastic vinylic polymers such as the polymers of the saturated acrylic acid esters. They are soluble in such organic solvents as acetone, dioxane, chloroform, ethyl cellosolve acetate, triacetin, phenyl cellosolve acetate, toluene, xylene, benzene, etc., and soften and flow upon heating under atmospheric pressure. All of these products may be molded into convenient shapes.

The process involving the preparation of the fusible polymer is particularly adapted to the preparation of shaped articles. In many cases, it is found difficult to form cast polymers from the monomeric material due to the numerous fractures which develop during polymerization. In accordance with the present invention, molded products may be secured by preparing the fusible polymer herein described and molding this polymer. The molded product may then be cured to the infusible state. The fusible polymer may be molded without purification, if desired, and in such a case the cast or molded product may then be treated to effect a conversion to the infusible state.

In accordance with my invention, I have found that upon subjection of these polymers to heating at temperatures somewhat above the softening point thereof, for a sufficient period of time, they are fused or blended and thereafter may be converted into infusible, insoluble, transparent, hard and wear-resistant products. Thus, while the fusible polymer melts or flows upon heating under nonpolymerizing conditions and at atmospheric pressure the converted infusible polymer does not flow under such conditions, and in general, cannot be molded. Occasionally, an infusible polymer softens slightly without deformation upon heating but often the polymer decomposes without visible softening. This conversion appears to occur in the absence of catalysts. It may be assisted, however, by the incorporation of usual polymerization catalysts, such as oxygen, ozone, air, peroxides, such as hydrogen peroxide, benzoyl peroxide or basic or acidic catalysts, light, etc. By use of catalysts, it is found that the conversion of these products to the infusible state may be secured at lower temperatures. The application of super-atmospheric pressure has been found to assist the transformation to the insoluble and infusible stage.

The properties of the products so produced are dependent to a degree upon the conditions under which they were rendered infusible. Thus, extremely hard, somewhat brittle products may be prepared by effecting the treatment at relatively high temperatures or under high pressures. On the other hand, somewhat stronger, less brittle materials may be secured when the treatment is conducted under moderate pressures and temperatures sufficiently low to permit a slow conversion of the fusible polymer into its infusible stage through a period in which it is substantially completely molten.

These resins are also suitable for many uses in the field of laminated products. For example, products of great strength, elasticity and adherence may be secured by converting fusible allyl or methallyl phthalate, etc., into the infusible state in the presence of a substantial amount of a compatible softening agent. Satisfactory non-shatterable glass sheets may be obtained by heating a combination of superposed sheets where the thermoplastic allyl phthalate polymer and a softening agent such as dibutyl phthalate are used as the adhesive layer.

It has been found that these products are applicable for impregnation purposes. Thus, leather, paper, wood or other comparatively porous substances may be steeped in a solution of the fusible polymer of methallyl phthalate, for example, and then heated alone, under pressure, or in the presence of catalysts to convert the absorbed polymer to the insoluble, infusible form. Greatly improved products, particularly in regard to strength, water-proofing, and electrical properties are obtained.

The following examples illustrate the conversion of the fusible resin into the infusible form:

*Example V*

Two parts by weight of fusible allyl phthalate polymer, prepared in accordance with Example I, containing 0.2 parts by weight of benzoyl peroxide, was rendered molten by heating under slight pressure at 140° C. in a mold, and then converted to a clear, hard, infusible, and insoluble sheet by heating at 170° C. under a pressure of 5000 pounds per square inch for one-half hour.

*Example VI*

Two parts of fusible methallyl phthalate polymer, prepared as in Example III, was fused at 140–150° C., and then molded as in Example II at 160–170° C. under pressure of 2000 pounds per square inch for one hour. The product obtained was hard, clear, and unaffected by solvents or heat to the point of pyrolytic decomposition.

The process may also be extended to the production of mixed polymers or copolymers. Thus, the fusible polymer or the monomer prepared in accordance with my invention may be mixed with other polymers such as polymers of methyl methacrylate, methyl chloracrylate, vinyl acetate, vinyl chloride, styrene, etc., and the mixture subjected to conditions of polymerization.

If desired, similar products may be made from suitable copolymers of the unsaturated esters of phthalic acid with other polymerizable saturated or unsaturated esters such as methyl, ethyl propyl, or butyl acrylate, methyl methacrylate or other acrylate or alpha-substituted acrylate or vinyl chloride, vinyl acetate, styrene, etc. In such cases, infusible products which are stronger and less brittle than the single polymer may be produced in this manner. This is particularly true when the allyl or other olefinic ester is polymerized with a saturated alcohol ester, such as the methyl or ethyl ester of methacrylic or chloracrylic acid.

By operation, in accordance with the present invention, it is thus possible to form a molded article from the fusible polymer such as the fusible polymeric allyl or methallyl phthalate previously referred to, and therefore to render the molded product insoluble and infusible by heat. In this manner, I am able to prepare transparent, hard, infusible molded products which have many of the desirable properties of the conventionally known thermoplastic resins. By proper regulation of the pressure and temperatue, the fusible polymer may be extruded under such conditions that it becomes infusible as it leaves the extrusion die.

A large number of inert substances may be incorporated with the fusible polymer before subjecting the molding condition. Suitable for such purposes are: fillers, such as wood-flour, mica, cotton flock, etc., plasticizers, such as dibutyl phthalate, di-cyclohexyl phthalate, triacetin, tricresyl phosphate, natural and synthetic resins, pigments, including titanium dioxide, carbon black, chromic oxide, lead chromate, etc., and organic dyestuffs such as methylene blue, methyl orange, etc.

Being of the thermosetting type, these resins do not exhibit the phenomenon of "cold flow," and are thus especially desirable for such uses as airplane windshields, where the pressure differences have been found to bow thermoplastic glass substitutes, particularly at the higher altitudes. Coatings may also be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may then be heat-hardened.

Although the present invention has been described with reference to the specific details of certain embodiments thereof, it is not intended that such details shall be regarded as limitations upon the scope of the invention except insofar as included in the accompanying claims. The term "polyester" in the claims refers to the number of alcohol groups which is attached to the phthalate group in contra-distinction to a polymerized ester.

I claim:

1. In a method of preparing a substantially infusible insoluble polymer the steps which comprise polymerizing an unsaturated alcohol polyester of phthalic acid, interrupting polymerization after substantial polymerization has occurred but before the polymer is converted to a gel, substantially completely separating residual monomer from the resulting fusible polymer before the polymer is polymerized to an infusible state, subjecting the resulting polymer to a temperature and pressure sufficient to insure the existence of the polymer in a fused state and continuing polymerization of the fused polymer for a time sufficient to convert the polymer into a substantially infusible and insoluble state.

2. The process of claim 1 wherein the ester is an allyl phthalate.

3. The process of claim 1 wherein the ester is a methallyl phthalate.

4. The process of claim 1 wherein the unsaturated alcohol contains no more than 10 carbon atoms.

5. The process of claim 1 wherein the polymer is fused in the presence of a polymerization inhibitor.

6. The process of claim 1 wherein the ester is an oleyl phthalate.

IRVING E. MUSKAT.